United States Patent Office 3,164,472
Patented Jan. 5, 1965

3,164,472
TREATMENT OF WORT WITH ZINC
Irwin M. Stone, Staten Island, N.Y., assignor to Baxter Laboratories, Inc., Morton Grove, Ill., a corporation of Delaware
No Drawing. Filed Aug. 22, 1962, Ser. No. 218,558
2 Claims. (Cl. 99—52)

This invention relates to a process for producing a fermented malt beverage having improved resistance to the deleterious effects of exposure to light and to beers and ales with inhibited tendencies to develop a skunky odor on said light exposure. Since beer is the most commercially significant member of the malt beverage family, this disclosure, for illustrative purposes, will be couched in terms of beer.

Beer has a propensity toward development of a sulfidic-type of odor upon exposure to sunlight or other strong light. It is for this reason that fermented malt beverages are not generally packaged in clear glass bottles. This odor is often called a sunstruck flavor or a skunky odor due to its resemblance to the characteristic, and readily identifiable, odor of the skunk.

The appearance of this odor is due to a series of chemical reactions initiated by the photochemical formation of a trace of hydrogen sulfide from the sulfur compounds normally present in the beer. This hydrogen sulfide reacts with certain constituents derived from the hops to form an unsaturated mercaptan type of compound which has a very potent skunk-like odor. The pathway of this reaction was elucidated and the malodorous mercaptan identifie as 3-methyl-2-butene-1-thiol by the Japanese workers Y. Kuroiwa and N. Hashimoto (Proceedings American Society of Brewing Chemists, 1961, pp. 28–36). Notwithstanding the fact that all these reactions take place at race level quantities in the beer; the malodorous nature of the end products of the reaction renders them readily perceptible, even at extremely high dilutions.

Since this series of reactions starts with the photochemical generation of hydrogen sulfide, it is possible to inhibit the development of a skunky odor by blocking one of the intermediate reactions. This blocking can be accomplished, for example, by reacting the hydrogen sulfide in the beer with a metal ion, such as copper or silver, to form a stable insoluble sulfide. While this addition of copper or silver ions to the beer does an admirable job in inhibiting the formation of the odorous compound, certain undesirable side-effects render impractical the use of these ions. These undesirable side-effects include wildness, off-tastes and hazes. Further, these metals are categorized as toxic and cannot be intentionally added to a food beverage.

The sulfur compounds which are decomposed photochemically to form hydrogen sulfide, are believed to be sulfhydryl compounds, such as the sulfur-containing amino acid, cysteine, which are present in trace amounts in beers. These sulfhydryl compounds find their way into the beer via the malt and as normal end products of yeast metabolism. In a paper on "The Action of Sunlight in Beer," by Philip P. Gray, Irwin Stone, and Harold Rothchild, published in the Wallerstein Laboratories Communications, vol. 4, pages 29–40, 1941, it was shown that the addition of traces of cysteine to the beer greatly increases its ability to form the immediate hydrogen sulfide and the final skunky odor.

These sulfhydryl compounds, which are present in the wort, survive the fermentation process and appear in trace amounts (a few parts per million) in the finished beer. At these levels, they do not affect the odor or flavor of the beer, per se, but upon photochemical or other decomposition they initiate the series of reactions outlined above, culminating in the production of compounds of penetrating, foul odor.

In accordance with the instant invention, it was observed that only extremely low trace levels of zinc are present in many worts and beers. Further, many such worts do not supply amounts of zinc sufficient to satisfy the nutritional requirements of the yeast during fermentation. Zinc is an essential trace metal, required for the proper nutrition and optimum fermentation activities of yeast. When zinc deficient worts are fortified with the merest traces of zinc ions of the order of only about 1 part per million, a stimulation of fermentation and an increase in yeast crop results. The speed and thoroughness with which yeast removes the added zinc ions from the wort is exceptional. Normally wort contains only about a couple of tenths of a part per million of zinc. Zinc, added to beer in amounts of up to about 5 parts per million is completely removed by and incorporated metabolically into the growing and fermenting yeast in a few hours, resulting in a beer that is virtually devoid of zinc.

It was further discovered, in accordance with this invention, that traces of zinc when added to wort prior to fermentation, caused the yeast cells during fermentation to generate and evolve significant quantities of hydrogen sulfide. This hydrogen sulfide is carried up with the large volume of carbon dioxide evolved during fermentation and swept out of the fermenting beer, along with the escaping fermentation gases. Through this evolution and removal of sulfur containing gases, the sulfhydryl content of the finished beer is reduced or eliminated. Under the influence of light this beer, because of its low sulfhydryl content, has a greatly improved resistance to the formation of skunky types of odors.

It is believed that the increased evolution of hydrogen sulfide in the escaping fermentor gases is accomplished, in accordance with the practice of this invention through the following mechanism. Many of the enzymes which play a role in the fermentation process incorporate a metal as an essential constituent of the enzyme molecule. Zinc is the constituent metal in many of these enzymes. Yeast alcohol dehydrogenase, for example, contains 4 atoms of zinc per molecule of enzyme. The desulfhydrase enzymes, of which cysteine desulfhydrase in typical, is of particular significance in this postulated mechanism. Cysteine desulfhydrase is the zinc-containing metallo enzyme that catalyses the break-down of cysteine into hydrogen sulfide, ammonia and pyruvic acid. It would appear that when yeast is grown on a zinc deficient wort (which is the normal state for commercial brewery worts), the marginal level of zinc available to the yeast cell is carefully allotted to the metallo-enzymes essential for the growth, metabolism, fermentation and survival of the yeast cell. Enzymes, such as the cysteine desulfhydrase system, which serve only accessory and less important metabolic functions, appear to be activated and formed when an abundant supply of zinc is available, a situation which occurs only after the more essential enzyme systems are surfeited. The addition of traces of zinc ions to a zinc-deficient wort provides a sufficient excess of zinc ions, over and above the amount required for the formation of the essential fermentation enzymes, to permit the yeast cells to synthesize the desulfhydrases. With the desulfhydrases thereby made available, cysteine or other sulfhydryl compounds in the beer are attacked, hydrogen sulfide is formed and evolved during the fermentation, and there is a greatly reduced or completely eliminated residuum of sulfhydryl compounds in the beer.

In the practice of this invention, the trace amounts of zinc are added to the wort at any convenient point before the commencement or completion of fermentation. It is particularly advantageous to add the zinc to the kettle during the boiling of the wort. The zinc salt may be added in solution or as a dry powder directly to the boiling wort in the kettle. The rapid boiling and ebullition which occurs at this stage effects the complete mixing and dispersion of the zinc througout the wort.

The commonly available zinc sulfate is a most convenient and stable salt for making this addition although other water-soluble salts such as the chloride or the acetate can also be used. These water-soluble zinc salts can be mixed with diluents such as sucrose, urea, ammonium sulfate or dextrose to add bulk and provide convenience for addition to the wort and in the preparation of solutions for making the additions.

Trace levels of the order of about 0.5 part of zinc ions per million parts of wort suffice to provide the beneficial results hereinbefore described. The optimal range of addition is about 0.5 part to about 5 parts of zinc per million parts of wort. Higher amounts may be used but generally increasing the zinc beyond a few parts per million does not give increased hydrogen sulfide evolution because of other limiting factors such as the usually low levels of initial sulfhydryl content of commercial wort. Because of the lack of toxicity of zinc for yeast cells amounts of up to 100 parts per million or more may be added without any detrimental affect on the yeast.

After the fermentation is complete, beers which have been produced by the methods of this invention are processed in the customary manner, without further change in normal routinely acceptable brewery practices.

The resulting beer is free of the added zinc ions, as the growing and fermenting yeast rapidly and efficiently removes the zinc from the fermenting liquors. The addition of zinc ions to beer does not inhibit the development of skunkiness as do copper and silver ions. The effect obtained in this process is not, therefore, attributable to a carry over of zinc ions into the beer with the ultimate formation of an insoluble sulfide.

The beers produced by this invention have a much cleaner flavor, are free of a sulfury character, and on exposure to light have an increased resistance to the development of skunky off-flavors than similar beers fermented from a zinc deficient wort.

What I claim is:

1. In the process of producing, by yeast fermentation of wort, fermented malt beverages of improved flavor and increased resistance to the photochemical production of sulfidic-type odors comprising the steps of adding zinc ions to the wort in amounts of from about 0.5 to 5.0 parts of zinc per million parts of wort prior to commencement of the fermentation and then fermenting with yeast.

2. In the process of producing, by yeast fermentation of wort, fermented malt beverages of improved flavor and increased resistance to the photochemical production of sulfidic-type odors, the step of adding zinc ions to the wort during the course of fermentation in amounts of 0.5 to 5.0 parts of zinc per million parts of fermenting wort.

References Cited in the file of this patent

UNITED STATES PATENTS 2,991,231   Lucht et al. _____ July 4, 1961